(12) United States Patent
Goel

(10) Patent No.: US 11,418,479 B2
(45) Date of Patent: Aug. 16, 2022

(54) METHODS, SYSTEMS, AND COMPUTER READABLE MEDIA FOR CREATING INTERNET PROTOCOL (IP) ADDRESS POOLS FROM DYNAMIC HOST CONFIGURATION PROTOCOL (DHCP) SERVERS TO ASYNCHRONOUSLY SERVE IP ADDRESS ALLOCATION REQUESTS BY SESSION MANAGEMENT FUNCTIONS (SMFS)

(71) Applicant: Oracle International Corporation, Redwood Shores, CA (US)

(72) Inventor: Yesh Goel, Bangalore (IN)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 0 days.

(21) Appl. No.: 17/125,925

(22) Filed: Dec. 17, 2020

(65) Prior Publication Data
US 2022/0200951 A1 Jun. 23, 2022

(51) Int. Cl.
H04L 61/5014 (2022.01)
H04L 61/10 (2022.01)

(52) U.S. Cl.
CPC .......... H04L 61/2015 (2013.01); H04L 61/10 (2013.01)

(58) Field of Classification Search
CPC .. H04L 61/2015; H04L 61/10; H04L 61/2061
USPC ........................................................ 709/245
See application file for complete search history.

(56) References Cited

U.S. PATENT DOCUMENTS

| 7,197,549 B1* | 3/2007 | Salama ............. H04L 29/12283 709/223 |
| 7,836,182 B1* | 11/2010 | Scano ................. H04L 61/2007 709/226 |
| 8,964,614 B1 | 2/2015 | Hassan et al. |
| 2006/0161661 A1 | 7/2006 | Johnson et al. |
| 2007/0147394 A1* | 6/2007 | Wilkinson ................ G06F 1/14 370/398 |

(Continued)

OTHER PUBLICATIONS

"3rd Generation Partnership Project; Technical Specification Group Services and System Aspects; System architecture for the 5G System (5GS); Stage 2 (Release 16)," 3GPP TS 23.501, V16.6.0, pp. 1-447 (Sep. 2020).

(Continued)

Primary Examiner — Zi Ye
(74) Attorney, Agent, or Firm — Jenkins, Wilson, Taylor & Hunt, P.A.

(57) ABSTRACT

A method for obtaining and maintaining Internet protocol (IP) address pools and using the IP address pools to respond to IP address allocation requests from service management functions (SMFs) includes, at an IP address provider microservice implemented using at least one processor, obtaining from dynamic host configuration protocol (DHCP) servers, a plurality of IP addresses and corresponding IP address leases and storing the IP addresses in IP address pools. The steps further include maintaining the IP address leases. The method further includes receiving, from an SMF, a request for allocation of an IP address. The method further includes allocating one of the IP addresses from one of the pools to the SMF. The method further includes communicating the IP address to the SMF.

20 Claims, 8 Drawing Sheets

(56) References Cited

U.S. PATENT DOCUMENTS

| | | | | |
|---|---|---|---|---|
| 2009/0006585 A1* | 1/2009 | Chen | ................ | H04L 29/12311 |
| | | | | 709/220 |
| 2009/0307338 A1* | 12/2009 | Arberg | ................ | H04L 61/2053 |
| | | | | 709/221 |
| 2014/0344475 A1* | 11/2014 | Chen | ................ | H04L 61/2053 |
| | | | | 709/245 |
| 2019/0021064 A1* | 1/2019 | Ryu | ................ | H04W 76/27 |

OTHER PUBLICATIONS

"3rd Generation Partnership Project; Technical Specification Group Core Network and Terminals; 5G System; Session Management Services; Stage 3 (Release 16)," 3GPP TS 29.502, V16.5.0, pp. 1-260 (Sep. 2020).

"3rd Generation Partnership Project; Technical Specification Group Core Network and Terminals; 5G System; Network Function Repository Services; Stage 3 (Release 16)," 3GPP TS 29.510, V16.5.0, pp. 1-208 (Sep. 2020).

Droms et al., "Dynamic Host Configuration Protocol for IPv6 (DHCPv6)," RFC 3315, pp. 1-101 (Jul. 2003).

Droms, "Dynamic Host Configuration Protocol," RFC 2131, pp. 1-45 (Mar. 1997).

"Evaluation of solution #12 on IP address allocation," SA WG2 Meeting #128-BIS, pp. 1-4 (Aug. 20-15, 2018).

"Interworking with DHCP," 3GPP TSG-CT WG3 Meeting #94, pp. 1-8 (Jan. 22-26, 2018).

"IP index from UDM," 3GPP TSG SA WG2 Meeting #137E, pp. 1-4 (Feb. 24-27, 2020).

Notification of Transmittal of the International Search Report and the Written Opinion of the International Searching Authority, or the Declaration for International Application No. PCT/US2021/057160 (dated Jan. 24, 2022).

* cited by examiner

METHODS, SYSTEMS, AND COMPUTER READABLE MEDIA FOR CREATING INTERNET PROTOCOL (IP) ADDRESS POOLS FROM DYNAMIC HOST CONFIGURATION PROTOCOL (DHCP) SERVERS TO ASYNCHRONOUSLY SERVE IP ADDRESS ALLOCATION REQUESTS BY SESSION MANAGEMENT FUNCTIONS (SMFS)

TECHNICAL FIELD

The subject matter described herein relates to network addressing in 5G communications networks. More particularly, the subject matter described herein relates to methods, systems, and computer readable media for creating IP address pools from interactions with DHCP servers, automatically maintaining IP address leases for IP addresses in the IP address pools, and asynchronously serving IP address allocation requests from SMFs using the IP address pools.

BACKGROUND

In 5G telecommunications networks, the network node that provides service is referred to as a producer network function (NF). A network node that consumes services is referred to as a consumer NF. A network function can be both a producer NF and a consumer NF depending on whether it is consuming or providing service.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains service profiles of available NF instances identifying the services supported by each NF instance. Consumer NFs can subscribe to receive information about producer NF instances that have registered with the NRF.

In addition to consumer NFs, another type of network node that can subscribe to receive information about NF service instances is a service communication proxy (SCP). The SCP subscribes with the NRF and obtains reachability and service profile information regarding producer NF service instances. Consumer NFs connect to the service communication proxy, and the service communication proxy load balances traffic among producer NF service instances that provide the required service or directly routes the traffic to the destination producer NF instance.

In addition to the SCP, other examples of intermediate proxy nodes or groups of network nodes that route traffic between producer and consumer NFs include the security edge protection proxy (SEPP), the service gateway, and nodes in the 5G service mesh. The SEPP is the network node used to protect control plane traffic that is exchanged between different 5G public land mobile networks (PLMNs). As such, the SEPP performs message filtering, policing and topology hiding for all application programming interface (API) messages.

One challenge that exists in the 5G communications network architecture is obtaining IP addresses for packet data unit (PDU) sessions and renewing leases of IP addresses with DHCP servers. For example, when a UE requests establishment of a PDU session, the UE may indicate that an IPv4 address, an IPv6 address, or both are required for the session. The UE requests the IP address allocation as part of the session establishment procedure. The 5G communications network communicates with DHCP servers to obtain the IP address or addresses for the session. According to DHCP, the IP address or addresses are granted under a lease that must be renewed.

One problem or challenge with this architecture is that for every PDU session requiring IP address leasing, the procedure is synchronous with the SMF in that the SMF must contact the DHCP server to obtain an IP address lease, maintain the lease timer, and, if the session lasts longer than the lease, renew the IP address before the lease expires. The SMF is also responsible for releasing IP addresses back to the DHCP server when a PDU session ends. Since this procedure may be required for many if not all PDU sessions, the burden on the SMF in processing and maintaining IP address leases can result in delayed PDU session establishment.

In light of these and other challenges, the subject matter described herein includes improved methods, systems, and computer readable media for obtaining and maintaining IP address leases in 5G communications networks.

SUMMARY

A method for obtaining and maintaining Internet protocol (IP) address pools and using the IP address pools to respond to IP address allocation requests from service management functions (SMFs) includes, at an IP address provider microservice implemented using at least one processor, obtaining from dynamic host configuration protocol (DHCP) servers, a plurality of IP addresses and corresponding IP address leases and storing the IP addresses in IP address pools. The method further includes maintaining the IP address leases. The method further includes receiving, from an SMF, a request for allocation of an IP address. The method further includes allocating one of the IP addresses from one of the pools to the SMF. The method further includes communicating the IP address to the SMF.

According to another aspect of the subject matter described herein, obtaining the IP addresses and corresponding IP address leases from the DHCP servers includes requesting allocation of IP addresses from the DHCP servers until an initial number of IP addresses is present in each of the IP address pools.

According to another aspect of the subject matter described herein, the initial number is a static number set by a network operator.

According to another aspect of the subject matter described herein, the initial number is a dynamic number that is set dynamically based on a volume of IP address allocation requests from SMFs.

According to another aspect of the subject matter described herein, maintaining the IP address leases includes, for each IP address lease: maintaining a lease renewal timer that is configured to expire prior to a lease expiration time for the IP address lease; detecting expiration of the renewal timer; and in response to expiration of the lease renewal timer, transmitting, to the DHCP servers, a lease request for requesting renewal of the IP address lease.

According to yet another aspect of the subject matter described herein, the method for method for obtaining and maintaining IP address pools and using the IP address pools to respond to IP address allocation requests from SMFs includes maintaining a timer queue with entries for each IP address lease, where detecting expiration of the lease renewal timer includes detecting when a current time is equal to a timer value for an entry at the head of the timer queue, removing the entry from the head of the timer queue, and sending the renewal request to renew the IP address lease for the entry at the head of the timer queue.

According to yet another aspect of the subject matter described herein, the method for obtaining and maintaining IP address pools and using the IP address pools to respond to IP address allocation requests from SMFs includes receiving a response to the lease renewal request containing a renewed lease expiration time from the DHCP servers and creating a new entry in the timer queue at a location corresponding to the renewed lease expiration time.

According to yet another aspect of the subject matter described herein, maintaining the IP address leases includes maintaining the IP address leases transparently from the SMF.

According to yet another aspect of the subject matter described herein, maintaining IP addresses leases transparently from the SMF includes automatically renewing the IP address leases in response to expiration of lease renewal timers at the IP address provider microservice.

According to yet another aspect of the subject matter described herein method for obtaining and maintaining Internet protocol (IP) address pools and using the IP address pools to respond to IP address allocation requests from SMFs includes providing an application programming interface (API) for the SMF to request, from the IP address provider microservice, allocation of IP addresses, and wherein receiving the request for allocation of an IP address includes receiving the request via the API.

According to yet another aspect of the subject matter described herein, a system for obtaining and maintaining Internet protocol (IP) address pools and using the IP address pools to respond to IP address allocation requests from service management functions (SMFs) is provided. The system includes at least one processor and a memory. The system further includes an IP address provider microservice implemented using the at least one processor for obtaining from dynamic host configuration protocol (DHCP) servers, a plurality of IP addresses and corresponding IP address leases and storing the IP addresses in the memory as IP address pools, maintaining the IP address leases, receiving, from an SMF, a request for allocation of an IP address, allocating one of the IP addresses from one of the pools to the SMF, and communicating the IP address to the SMF.

According to yet another aspect of the subject matter described herein, the IP address provider microservice is configured to obtain the IP addresses and corresponding IP address leases from the DHCP servers by requesting allocation of IP addresses from the DHCP servers until an initial number of IP addresses is present in each of the IP address pools.

According to yet another aspect of the subject matter described herein, the IP address provider microservice is configured to maintain the IP address leases by, for each IP address lease: maintaining a lease renewal timer that is configured to expire prior to a lease expiration time for the IP address lease; detecting expiration of the renewal timer; in response to expiration of the renewal timer, transmitting, from the IP address provider microservice to the DHCP servers, a renewal request for requesting renewal of the IP address leases.

According to another aspect of the subject matter described herein, the IP address provider microservice is configured to maintain a timer queue with entries for each IP address lease and to detect expiration of the renewal timer by detecting when a current time is equal to a timer value for an entry at the head of the timer queue, wherein, in response to expiration of the renewal timer, the IP address provider microservice is configured to remove the entry from the head of the timer queue.

According to yet another aspect of the subject matter described herein, the IP address provider microservice is configured to receive a response to the renewal request containing a renewed lease expiration time from the DHCP servers, and create a new entry in the timer queue at a location corresponding to the renewed lease expiration time.

According to yet another aspect of the subject matter described herein, the IP address provider microservice is configured to maintain the IP address leases transparently from the SMF by automatically renewing the IP address leases in response to expiration of lease renewal timers at the IP address provider m icroservice.

According to yet another aspect of the subject matter described herein, the IP address provider microservice is configured to provide an application programming interface (API) for the SMF to request, from the IP address provider microservice, allocation of IP addresses, and wherein receiving the request for allocation of an IP address includes receiving the request via the API.

According to yet another aspect of the subject matter described herein, a non-transitory computer readable medium having stored thereon executable instructions that when executed by at least one processor of a computer controls the computer to perform steps is provided. The steps are performed at an Internet protocol (IP) address microservice implemented using the at least one processor. The steps include obtaining from dynamic host configuration protocol (DHCP) servers, a plurality of IP addresses and corresponding IP address leases and storing the IP addresses in IP address pools. The steps further include maintaining the IP address leases. The steps further include receiving, from a service management function (SMF), a request for allocation of an IP address. The steps further include allocating one of the IP addresses from one of the pools to the SMF. The steps further include communicating the IP address to the SMF.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for creating IP address pools from DHCP servers and asynchronously serving IP address allocation requests from a 5G SMF. The asynchronous serving of IP address allocation requests from a 5G SMF may be implemented by an IP address provider microservice that interacts with the SMF on the 5G network side and with DHCP servers on the packet data network side. Before explaining the IP address provider microservice, the 5G network architecture with which the IP address provider microservice interacts will be explained in detail.

Figure 1:
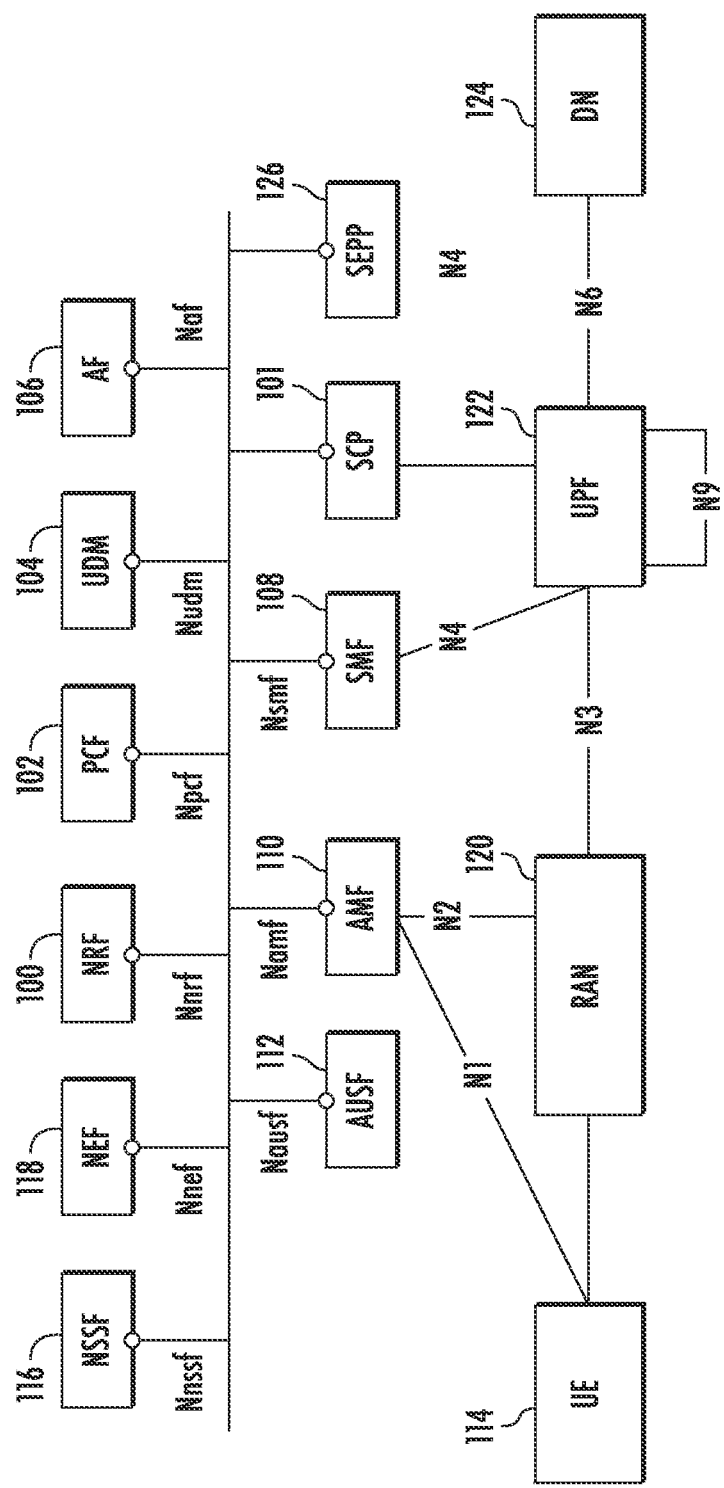
FIG. 1 is a network diagram illustrating an exemplary 5G network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available producer NF service instances and their supported services and allow consumer NFs or SCPs to subscribe to and be notified of the registration of new/updated producer NF instances. SCP 101 may also support service discovery and selection of producer NF instances. SCP 101 may perform load balancing of connections between consumer and producer NFs.

NRF 100 is a repository for NF or service profiles of producer NF instances. In order to communicate with a producer NF instance, a consumer NF or an SCP must obtain the NF or service profile or the producer NF instance from NRF 100. The NF or service profile is a JavaScript object notation (JSON) data structure defined in Third Generation Partnership Project (3GPP) Technical Specification (TS) 29.510. The NF or service profile definition includes at least one of a fully qualified domain name (FQDN), an Internet protocol (IP) version 4 (IPv4) address or an IP version 6 (IPv6) address. In FIG. 1, any of the nodes (other than NRF 100) can be either consumer NFs or producer NFs, depending on whether they are requesting or providing services. In the illustrated example, the nodes include a policy control function (PCF) 102 that performs policy related operations in a network, a unified data management (UDM) function 104 that manages user data, and an application function (AF) 106 that provides application services. The nodes illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with an SEPP in a foreign PLMN which manages security for the foreign PLMN. Thus, traffic between NFs in different PLMNs may traverse two SEPP functions, one for the home PLMN and the other for the foreign PLMN.

Figure 2:
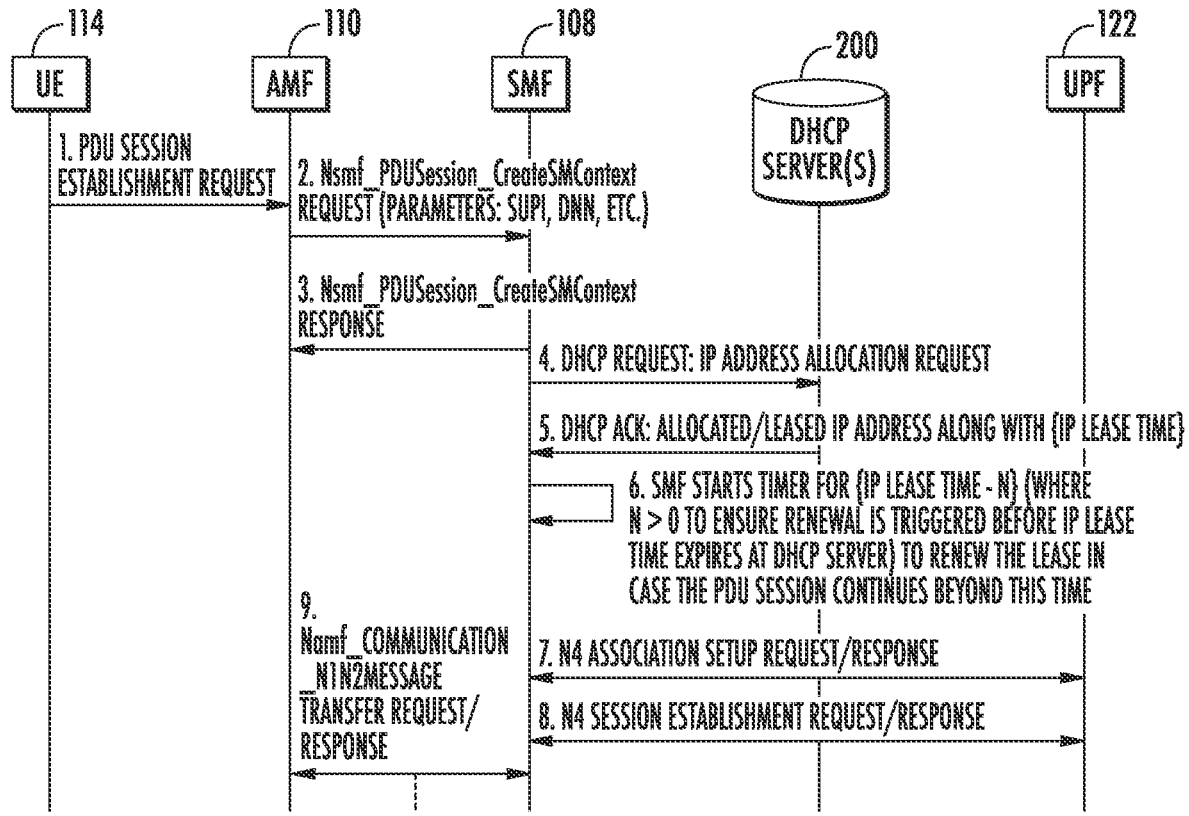
FIG. 2 is a message flow diagram illustrating exemplary messaging associated with obtaining an IP address lease for a PDU session.

As stated above, one problem with the current 3GPP architecture is that the SMF is required to obtain and maintain IP address leases with DHCP servers for every PDU session that requires an IP address. FIG. 2 illustrates exemplary signaling performed between 5G network elements to obtain an IP address lease. Referring to FIG. 2, in line 1, UE 114 sends a PDU session establishment request to AMF 110. In this example, it is assumed that UE 114 indicates that it needs at least one IP address to establish the PDU session.

In line 2 of the message flow diagram, AMF 110, in response to the PDU session establishment request sends an Nsmf_PDU Session_Create SM context request to SMF 108. The Nsmf_PDU Session_Create SM context request includes parameters, such as the subscription permanent identifier (SUPI), data network name (DNN) and other parameters. In line 3 of the message flow diagram, SMF 108 acknowledges receipt of the Nsmf_PDU Session_Create SM context message by transmitting an Nsmf_PDU Session_Create SM context response to AMF 110.

Since at least one IP address was requested by the UE, in line 4, SMF 108 sends a DHCP request to DHCP servers 200 requesting allocation of at least one IP address. DHCP servers 200 respond to the request in line 5 by providing an IP address and a lease time for the IP address.

In response to receiving the IP address and the lease time, in line 6, SMF 108 starts a timer (IP lease time-n), where n is greater than 0 to ensure that renewal is triggered before the IP lease timer expires at the DHCP server so that SMF 108 will renew the lease before it expires in case the PDU session extends beyond the lease time.

In line 7, UPF 122 sends an N4 association setup request to SMF 108. In line 8, SMF 108 and UPF 122 exchange N4 session establishment request and response messages. In line 9, SMF 108 and AMF 110 exchange Namf_Communication_ N1N2 message transfer request and response messages.

It should be noted that the message flow illustrated in FIG. 2 must be performed by SMF 108 for each PDU session for which at least one IP address is requested. This can create a burden on resources of SMF 108 and can delay session establishment time. In addition, SMF 108 must renew each lease if the PDU session extends beyond the current lease expiration time.

Figure 3:
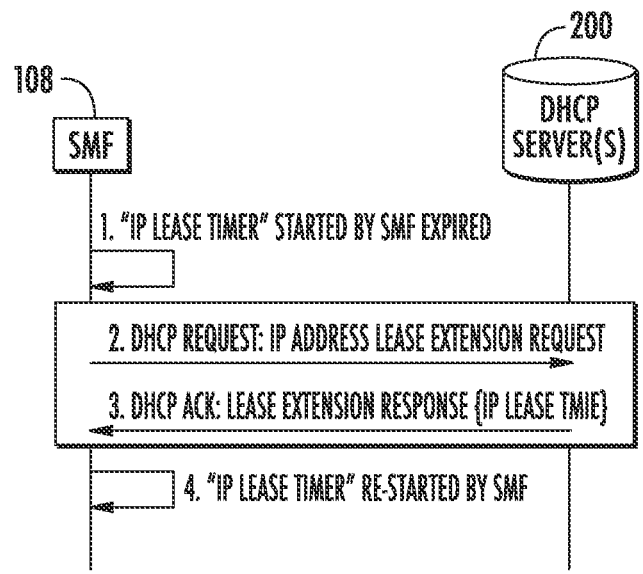
FIG. 3 is a network diagram illustrating exemplary messaging between an SMF and DHCP servers in maintaining an IP address lease.

FIG. 3 is a message flow diagram illustrating exemplary signaling performed by SMF 108 to renew a lease. Referring to FIG. 3, in line 1, the IP lease timer started by SMF 108 in response to receiving an IP address lease from the DHCP server expires. In line 2, SMF 108 sends a DHCP request to DHCP servers 200 requesting an extension of the IP address lease. In line 3, DHCP servers 200 respond with an acknowledgement indicating that the lease has been extended provides a new lease expiration time. In line 4, SMF 108 restarts the IP lease timer for the new IP lease expiration time.

The signaling message flow illustrated in FIG. 3 must be performed by SMF 108 for each IP address lease that expires before the end of a PDU session. As the number of PDU sessions handled by an SMF increases, the burden on the SMF also increases. In order to reduce the processing burden on the SMF, the subject matter described herein includes an IP address provider microservice that obtains a pool of leased IP addresses per destination network name (DNN), makes the leased IP addresses available to the SMF for PDU sessions, and automatically renews leases prior to PDU session expiration times.

Figure 4:
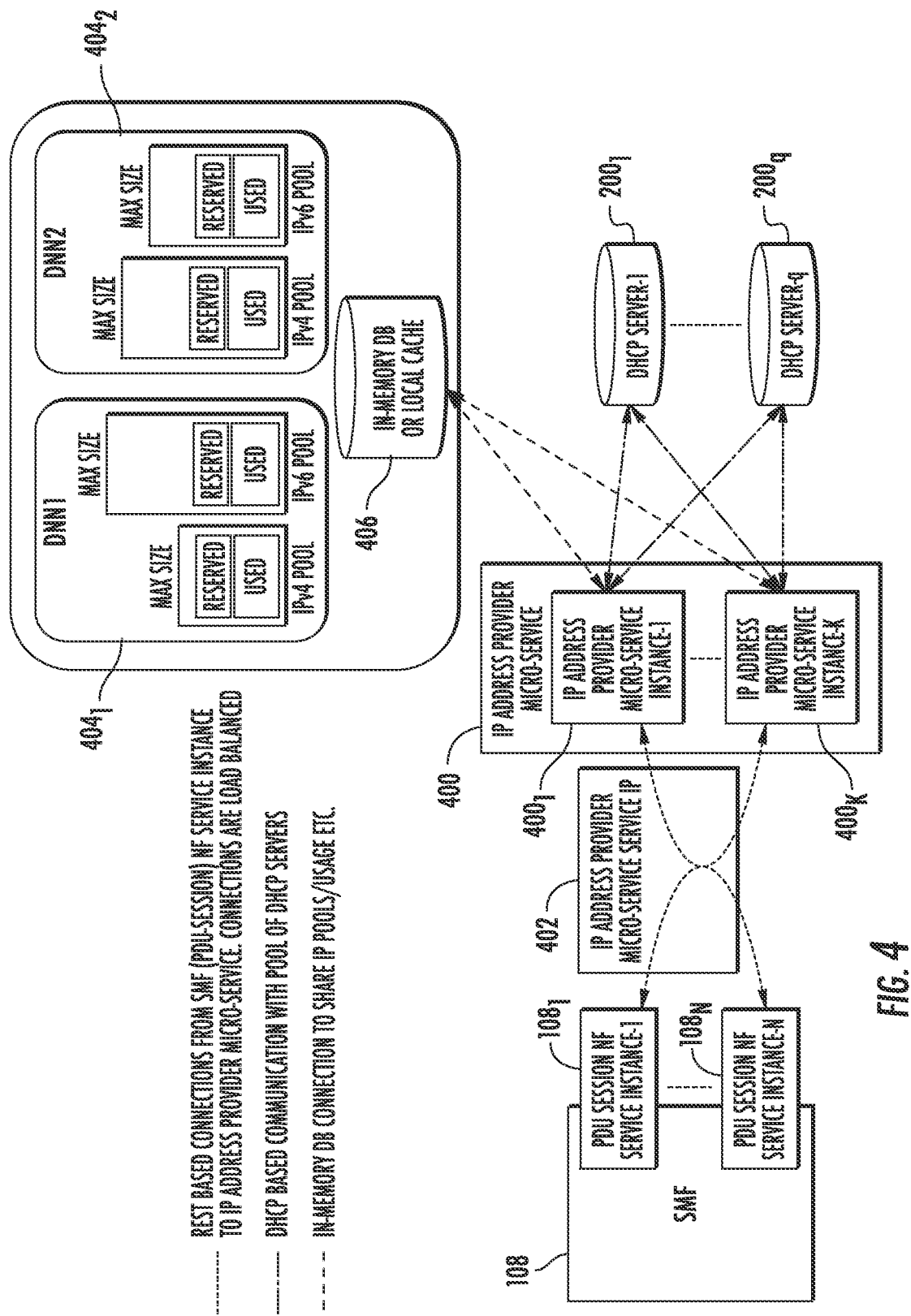
FIG. 4 is a network diagram illustrating an IP address provider microservice that interacts with the SMF and maintains IP address leases on behalf of the SMF.

Rather than having the SMF request IP lease allocations, maintain the leases, and renew the leases, the subject matter described herein includes an IP address provider microservice that performs these functions automatically and transparently with respect to the SMF[H]. FIG. 4 illustrates an IP address provider microservice and exemplary operations performed by the IP address provider microservice. Referring to FIG. 4, IP address provider microservice 400 manages one or more pool of leased IP addresses per destination network name (DNN). There may be separate pools for IP version 4 and IP version 6 addresses. hi addition, IP address provider microservice 400 may provide or maintain a list of used versus reserved leased IP addresses per IP address pool. IP address provider microservice 400 may provide APIs to allocate and release IP addresses for PDU sessions using the IP address pools. IP address provider microservice 400 may provide a representational state transfer (REST)-based subscription mechanism to notify the SMF or PDU session NF service of an IP address exhaustion threshold being reached per DNN and also of DHCP server availability. IP address provider microservice 400 may manage the life cycles of IP addresses leased from DHCP servers on behalf of SMF 108. Maintaining the IP addresses may include pre-leasing reserved IP addresses at the startup or initialization of IP address provider microservice 400, renewing leased IP addresses ahead of expiration time at the DHCP server, managing the status of leased IP addresses with the microservice. Managing the status of the leased IP addresses may include marking the IP addresses as used or allocated to the SMF/PDU session NF service or reserved, i.e., not allocated to the SMF/PDU session NF service. IP address provider microservice 400 may also maintain a list of unused leased IP addresses. The size of this list may be based on a static or dynamic algorithm. A static algorithm means that the size of the unused or reserved IP addresses is constant. A dynamic algorithm means that IP address provider microservice 400 may change the size of the unused IP address pool based on a usage pattern by the SMF or PDU session NF service.

IP address provider microservice 400 may be implemented on at least one computing platform including a processor and a memory. The memory may store the IP address pools and other data structures described herein, as well as the computer executable instructions for performing the steps described herein for obtaining IP address leases from DHCP servers, maintaining the leases, and allocating IP addresses to SMFs in response to IP address allocation requests from the SMFs. IP address provider microservice 400 may be separate from the SMFs that it serves and separate from the DHCP servers from which IP address provider microservice 400 obtains IP addresses and corresponding leases. Operating as a separate entity between the SMFs and the DHCP servers enables IP address provider microservice 400 to be scaled based on network operator requirements, including requirements for high availability. IP address provider microservice 400 may include an in-memory database that stores the IP address pools. IP address provider microservice 400 may significantly improve latency in PDU session establishment by removing the time and processing on the part of SMFs to interact with the DHCP servers for IP address leasing.

In FIG. 4, IP address provider microservice 400 provides an IP address 402 as a contact address for SMF 108 and SMF PDU session NF service instances $108_1$-$108_n$. As stated above, in the 5G network architecture, SMF 108 is the entity that handles the establishment and teardown of PDU sessions requested by UEs. PDU session NF service instances $108_1$-$108_n$ are service instances created by SMF 108 to handle PDU sessions. IP address provider microservice 400 may also include IP address provider microservice instances $400_1$-$400_k$ that interact with DHCP servers $200_1$-$200_q$ to obtain IP addresses and create IP address pools $404_1$ and $404_2$ for DNN1 and DNN2. IP address provider microservice 400 may store IP address pools $404_1$-$404_2$ in an in-memory database or cache 406.

In the illustrated example, each IP address pool $404_1$ and $404_2$ includes separate pools for IPv4 and IPv8 addresses. In addition, each pool has a maximum size which may be static or dynamic, depending on whether a static or dynamic reservation algorithm is implemented. Static reservation means that the number of IP address leases obtained from DHCP per DNN is a static number set by the network operator. Dynamic reservation means that the number of IP address leases obtained from DHCP per DNN is dynamically adjustable based on the number of IP address allocation requests received from SMFs within a timer period.

In the example illustrated in FIG. 4, within each address pool for a given DNN, IP address provider microservice 400 maintains lists of used versus reserved IP addresses. Used addresses are those have been leased from DHCP and are allocated to a PDU session. Reserved IP addresses are those that have been leased from DHCP but that have not been assigned to a PDU session.

IP address provider microservice 400 may operate and/or scale seamlessly on SMF/PDU session NF service instances scaling up or down, DHCP servers scaling up or down, or DHCP server updates due to the addition or deletion of DNNs. Because IP address provider microservice 400 is independent from the SMFs and the DHCP servers, IP address provider microservice can be scaled up or down to meet network demand.

Figure 5:
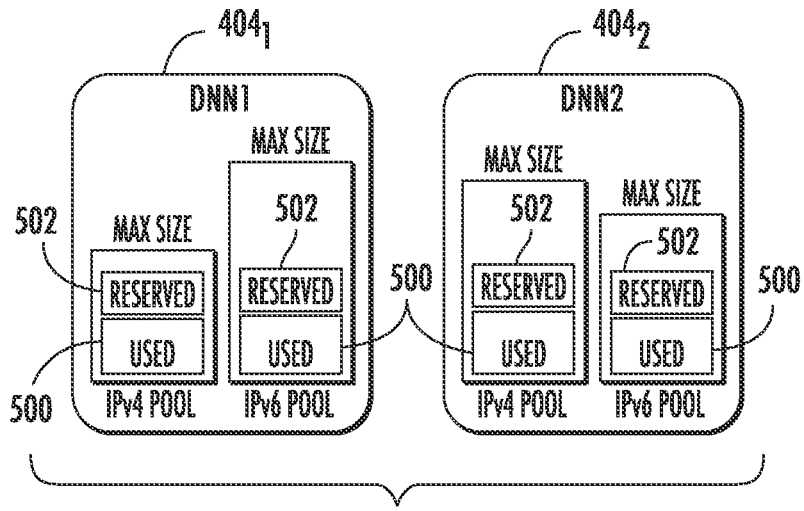
FIG. 5 is a block diagram illustrating exemplary IP address pool structures that may be maintained by the IP address provider microservice.

FIG. 5 illustrates the structure of IP address pools $404_1$ and $404_2$ in more detail. In FIG. 5, each IP address pool $404_1$ and $404_2$ includes an IP version 4 pool storing IP version 4 addresses and an IP version 6 pool containing IP version 6 addresses. Each of the IP version 4 pools and the IP version 6 pools has a maximum size, which may be configured statically by the network operator. Alternatively, the maximum size may vary dynamically based on the number of IP address allocation requests within a time period. Each of the IP version 4 and IP version 6 pools may include a list of used IP addresses 500 and a list of reserved IP addresses 502. As stated above used IP addresses 500 are those that have been obtained from the DHCP servers and are currently being used by PDU sessions. Reserved IP addresses 502 are those that have been obtained from the DHCP servers but that have not been allocated to PDU sessions.

Figure 6:
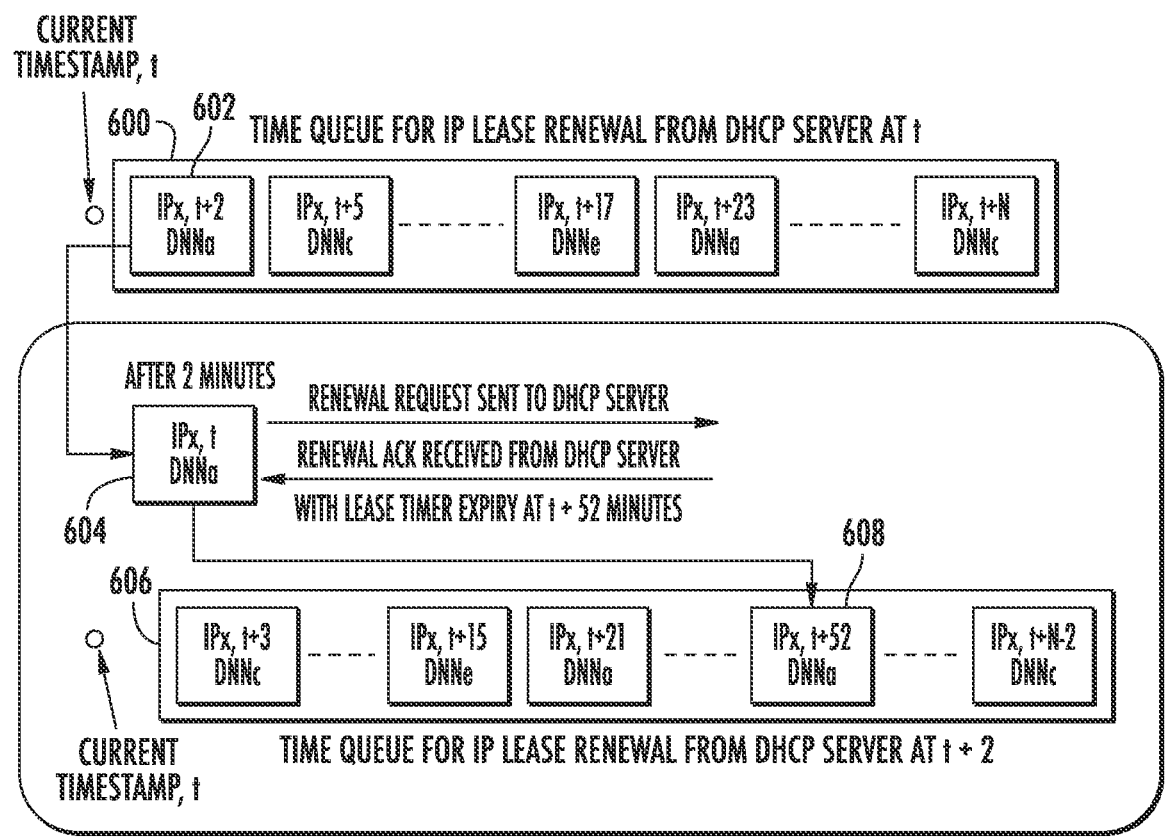
FIG. 6 is a block diagram illustrating a timer queue for IP address lease renewal.

FIG. 6 is a block diagram illustrating the structure of a timer queue for IP address renewal. More particularly, block 600 in FIG. 6 illustrates the timer queue for IP lease renewal from a DHCP server at time t. Each element in timer queue 600 indicates an IP address and a time at which the IP lease renewal should occur. For example, element 602 located at the head of timer queue 600 indicates that IP address IPx for DNNa should be renewed at time t+2 for, where t is the current time. The renewal time for each element may be set based on the lease expiration time received from the DHCP servers when the IP address was first leased or when the lease was last renewed. In one example, the renewal time may be set to a value that is less than the lease expiration time so that the lease can be renewed before it expires with the DHCP servers.

Block 604 illustrates the renewal of IP address IPx for DNNa at time t+2 when the lease renewal timer expires. In response to expiration of the renewal timer, IP address provider microservice 400 transmits a renewal request to the DHCP servers and receiving a renewal acknowledgement from the DHCP servers with a new lease expiration time which in the illustrated example is t+52 minutes. Block 606 illustrates the status of the timer queue at time t+2. It can be seen from block 606 that the new lease for IPx is placed in the queue at a location according to its renewal time which in the illustrated example is t+52. At time t+2, the element at the head of the timer queue indicates that the renewal time for IP address IPx for DNNc is t+3.

The timer queue includes a list of leased IP addresses, DHCP servers, and lease time expiration timestamps. These elements may be stored as a tuple and the queue may be ordered on the basis of lease time expiration timestamp received from the DHCP server. The timer queue can be processed by a single or multiple timer threads. The thread or threads may check at every time unit whether the expiration of a timestamp of the element at the front of the queue has occurred. If the current timestamp has expired, a DHCP renewal request is sent. The new timestamp received from the DHCP server causes a new element to be inserted at the tail of the queue, as illustrated by block 608.

IP address provider microservice 400 may expose APIs to the SMF or PDU session NF service instances in the SMF. These APIs include allocate IP (DNN, and IP address type(IPv4 or IPv6)), release IP, and subscribe for notifications. Thus, rather than requiring the SMF to maintain the lease expiration timers for IP addresses for each PDU session, all the SMF is required to do is request an IP address from IP address provider microservice 400, subscribe for notifications relating to the IP address, and notify IP address provider microservice 400 when a PDU session terminates. IP address provider microservice 400 transparently maintains the IP address lease on behalf of the SMF, sends any requested notifications to the SMF, and moves an IP address from the used pool to the reserved pool if the SMF notifies IP address provider microservice 400 that the PDU session using the IP address is being release.

Figure 7:
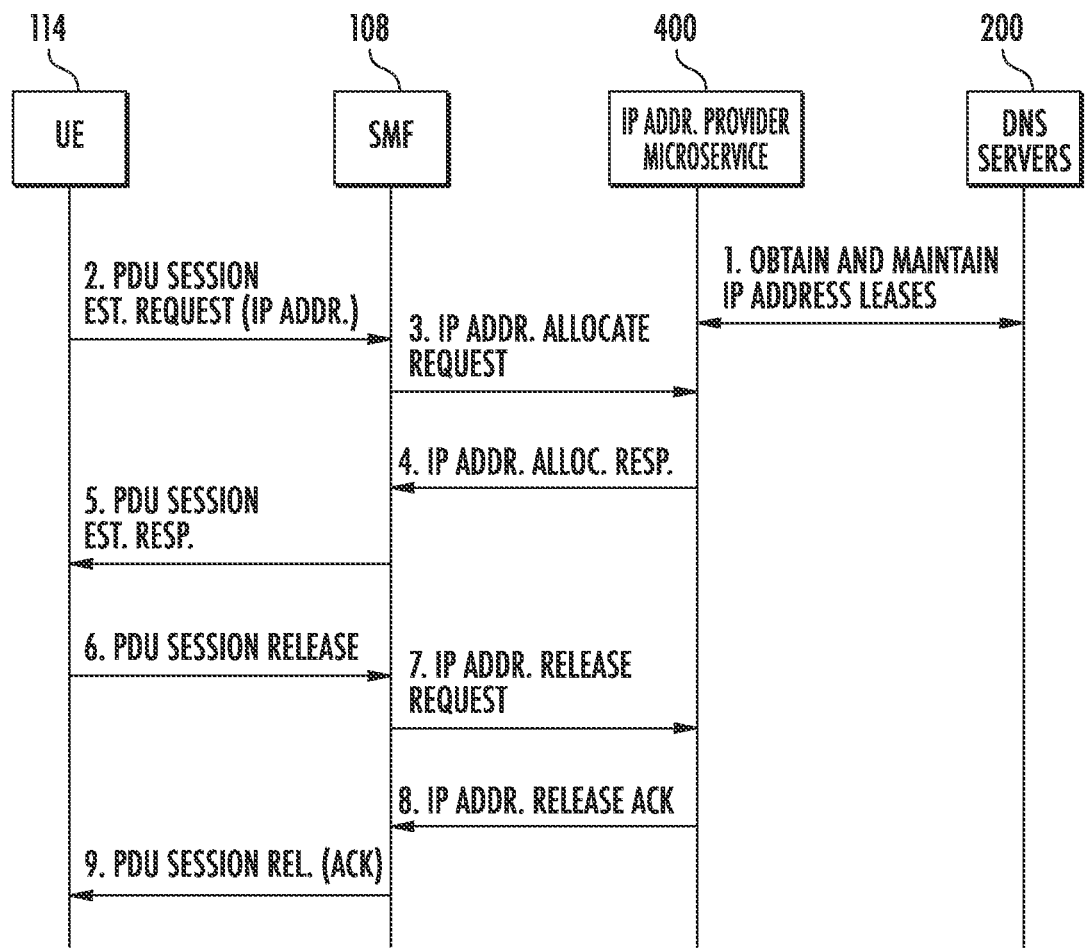
FIG. 7 is a message flow diagram illustrating exemplary messages exchanged between network nodes including an IP address provider microservice for obtaining and maintaining IP address leases.

FIG. 7 is a message flow diagram illustrating the reduced burden on the SMF provided by the IP address provider microservice described herein. Referring to FIG. 7, in line 1, IP address provider microservice 400 obtains and maintains IP address pools from DHCP servers 200. Details of obtaining and maintaining the IP address pools will be described below with regard to FIGS. 8 and 9.

In line 2 of the message flow diagram, UE 114 transmits a PDU session establishment request to SMF 108. The PDU session establishment request includes a request for at least one IP address for the PDU session. The IP address may be an IPv4 address, an IPv6 address, or both.

In line 3 of the message flow diagram, SMF 108 sends an IP address allocation request to IP address provider microservice 400. IP address provider 400 obtains an IP address from one of the IP address pools that it maintains in memory and, in line 4, sends an IP address allocation response message to SMF 108. It should be noted that the IP address allocation response message is not required to include an expiration time for the IP address, as IP address provider microservice 400 maintains lease expiration times on behalf of SMF 108. In line 5 of the message flow diagram, SMF 108 sends a PDU session establishment response to UE 114 including the requested IP address.

It should be noted that SMF 108 is no longer required to renew IP address leases with DHCP servers 200 as IP address provider microservice 400 performs this function automatically. Such renewals may occur until the session is released. In line 6, of the message flow diagram, UE 114 sends a PDU session release message to SMF 108. In line 7, SMF 108 sends an IP address release request message to IP address provider microservice 400. IP address provider microservice 400 releases the IP address by moving the IP address from the used to the reserved pool. In line 8, address provider microservice 400 sends an IP address release acknowledgement message to SMF 108. In line 9, SMF 108 sends a PDU session release acknowledgement message to UE 114.

Figure 8:
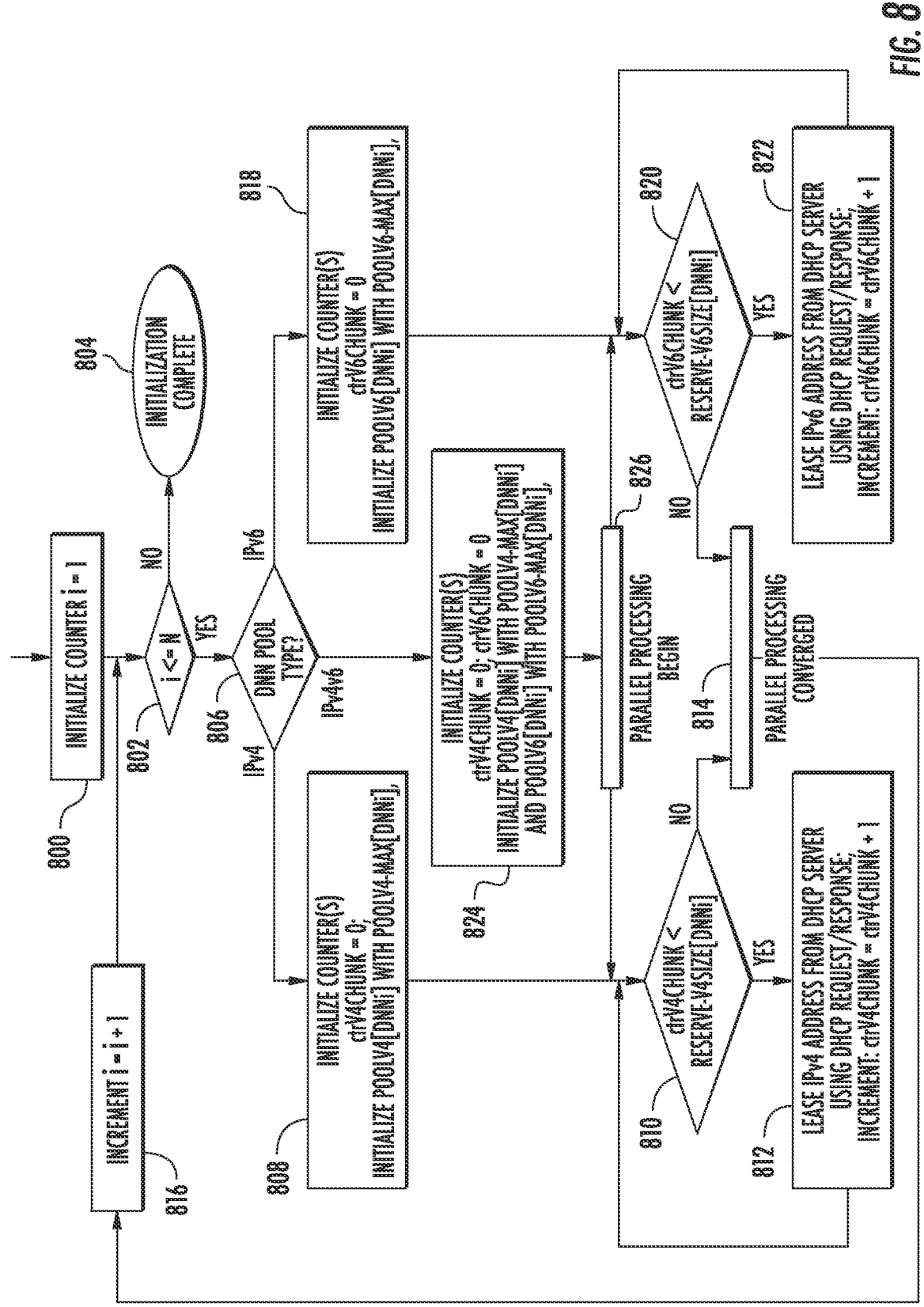
FIG. 8 is a flow chart illustrating an exemplary initialization algorithm for an IP address provider microservice.

FIG. 8 illustrates the process of initializing IP address provider microservice 400. The initialization process may be performed on a per DNN basis. In the flow chart in FIG. 8, N is equal to the number of DNNs and i is the index that represents the particular DNN for which initialization is being performed. The initialization process is also performed per IP address pool type where the types are IPv4, IPv6, and IPv4 and IPv6. Another configuration variable that is provisioned for each pool is the maximum pool size for each DNN.

Referring to the flow chart in FIG. 8, in step 800, the counter i is initialized to 1 to indicate that the first DNN's IP address pools are being initialized. In step 802, it is determined whether i is less than or equal to N, where N is the number of DNNs. If i is not less than or equal to N, this means that i is equal to N and all of the IP address pools for all of the DNNs have been initialized and control proceeds to step 804 where the initialization is complete. If all of the IP address pools for the DNNs have not been initialized, control proceeds to step 806 where the DNN pool type is determined. If the pool type is IPv4, control proceeds to step 808 where the counters are initialized, the counter ctrV4CHUNK is set to zero, and the IP address pool for $DNN_i$ is set to the maximum size for address pool for $DNN_i$.

Control then proceeds to step 810 where the counter ctrV4CHUNK is compared to the difference between a variable RESERVE and $V4SIZE[DNN_i]$. If the counter ctrV4CHUNK is less than the difference, control proceeds to step 812 where an IPv4 address is leased from the DHCP server using DHCP requests and responses and the counter ctrV4CHUNK is incremented. Steps 810 and 812 are repeated until all of the array elements in the array V4SIZE $[DNN_i]$ are filled with leased IP addresses. Control then proceeds to step 814 where processing of the IPv4 address pool is merged with the processing of the IPv6 pool and then to step 816 where the variable i is incremented to select the DNN and initialize the IP address pools for the next DNN.

The process for Initializing and building the IP version 6 address pool starts in step 818 where the counters and the array size variable for the IPv6 address pools are initialized. Control then proceeds to steps 820 and 824, where IPv6 addresses are leased and used to populate the IPv6 address pool for the DNN.

In step 806, if the pool type is IPv4 and IPv6, control proceeds to step 824 where the counters for the IP version 6 and IP version 4 arrays are initialized to 0, both the IP version 4 and IP version 6 address pool arrays are initialized to the maximum size. Then control proceeds to step 826 where parallel processing to populate the IP version 4 and IP version 6 address pools is performed in parallel. After the process in FIG. 8 is completed for all of the DNNs, all of the IP address pools should be populated with leased IP addresses.

Figure 9:
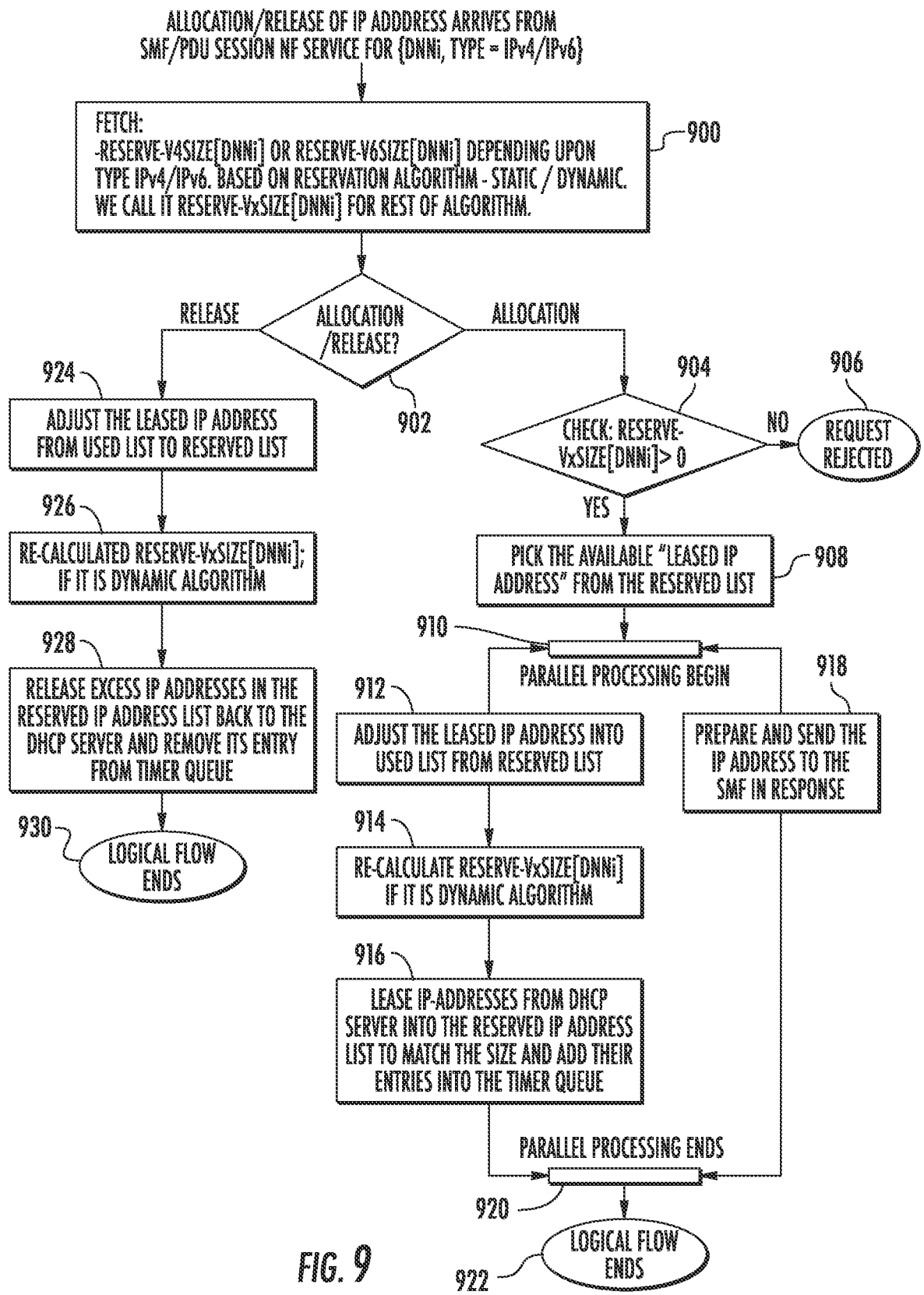
FIG. 9 is a flow chart illustrating an exemplary IP address allocation/release algorithm for an IP address provider microservice.

IP address provider microservice 400 also perform steps to allocate the leased IP addresses to the SMF. This process is illustrated in FIG. 9. Referring to FIG. 9, the process begins when IP address provider microservice 400 receives a request for allocation or release of an IP address from an SMF or PDU NF session NF service instance. The allocation or release is formatted according to the API provided by IP address provider microservice and includes a request type (allocation or release), a DNN, and an IP address type. In response to the request, in step 900, IP address provider microservice 400 fetches an IP address from one of the IP address pools depending on the IP address type. The process steps will also vary depending on whether a dynamic or static reservation algorithm is implemented.

In step 902, it is determined whether the request from the SMF is an allocation or a release. If the request is a request for IP address allocation, control proceeds to step 904 where it is determined whether there are any addresses in the reserved list. If there are no addresses in the reserved list, control proceeds to step 906 where the request is rejected. If addresses are present in the reserved list, control proceeds to step 908 where IP address provider microservice 400 selects the next available IP address from the reserved list.

From step 908, control proceeds to step 910 where parallel processing begins. One branch of the parallel processing begins in step 912 where the leased IP address is moved from the reserved list to the used list to indicate that the IP address has been allocated. If the dynamic algorithm is implemented, step 914 is executed where the IP address provider microservice recalculates the size of the reserve list. If a static algorithm is implemented, step 914 is skipped. In step 916, IP address provider microservice leases an IP address from the DHCP server into the reserved IP address list to match the adjusted pool size and adds corresponding entries for the newly leased IP addresses into the timer queue.

The other branch of the parallel processing from step 910 occurs in step 918 where the IP address provider microservice sends the IP address to the SMF in response to the allocation request. In step 920, parallel processing ends and the logical flow for address allocation ends in step 922

Returning to step 902, if the request from the SMF is a release request, control proceeds to step 924 where IP address provider microservice 400 moves the leased IP address from the used list into the reserved list. Control then proceeds to step 926 where, if the dynamic algorithm is implemented, IP address provider microservice 400 recalculates the size of the reserve list. If the static algorithm is implemented, step 926 is omitted.

In step 928, IP address provider microservice 400 releases excess IP addresses in the reserved IP address list back to the DHCP server and removes the corresponding entries from the timer queue. The excess IP addresses in step 928 may be those that have been released and that would cause the size of the reserve list to be larger than its configured value. In step 930, the process for releasing the IP address ends.

Figure 10:
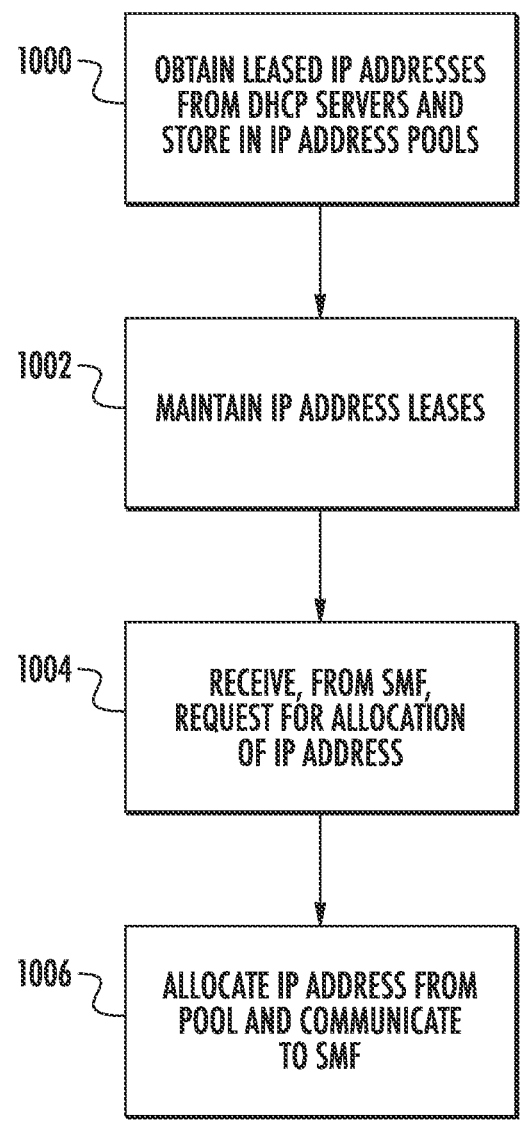
FIG. 10 is a flow chart illustrating an exemplary overall process for using an IP address provider microservice to obtain and utilize IP address pools to respond to allocation requests from SMFs.

FIG. 10 is a flow chart illustrating an exemplary process for obtaining leased IP addresses from DHCP servers and using the leased IP addresses to respond to IP address allocation requests from an SMF. Referring to FIG. 10, in step 1000, IP addresses are obtained from DHCP servers and stored in IP address pools. For example, IP address provider microservice 400, which may be separate from SMF 108 and DHCP servers 200, may request and obtain IP addresses and corresponding leases from DHCP servers 200 and store the leased IP addresses in IP address pools.

In step 1002, the process includes maintaining the IP address leases. Maintaining the IP address leases may be performed by IP address provider microservice 400 keeping all of the lease expiration timers and, if necessary, renewing leases if an IP address is in use by a PDU session that lasts longer than the lease renewal timer.

In step 1004, the process includes receiving, from an SMF, a request for allocation of an IP address. For example, IP address provider microservice 400 may receive a request for allocation of an IP address from SMF 108. The request may be formatted using the API provided by IP address provider microservice 400.

In step 1006, the process includes allocating the IP address from the pool to the SMF and communicating the IP address to the SMF. For example, SMF 108 may allocate an IP address from one of the reserved IP address lists in one of the IP address pools and communicate the IP address to the requesting SMF.

Thus, using the steps described herein, the functionality of the SMF is greatly simplified. In addition, using the IP address provider microservice to pre-lease pools of IP addresses from DHCP servers, PDU session setup time can also be reduced. Further, the likelihood of a lease expiration causing a disruption in a PDU session is further reduced.

The disclosure of each of the following references is incorporated herein by reference in its entirety.

REFERENCES 1. 3rd Generation Partnership Project; Technical Specification Group Services and System Aspects; System architecture for the 5G System (5GS); Stage 2 (Release 16), 3GPP TS 23.501, V16.6.0 (September 2020).
2. Droms et al., "Dynamic Host Configuration Protocol," IETF RFC 2131, March 1997.
3. Droms et al., "Dynamic Host Configuration Protocol for IPv6 (DHCPv6)," July 2003.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for obtaining and maintaining Internet protocol (IP) address pools and using the IP address pools to respond to IP address allocation requests from service management functions (SMFs), the method comprising:
   at an IP address provider microservice including a plurality of IP address microservice instances implemented using at least one processor:
      obtaining, from a plurality of dynamic host configuration protocol (DHCP) servers, a plurality of IP addresses and corresponding IP address leases and storing, in memory of the IP address provider microservice, which is separate from the DHCP servers, the IP addresses in IP address pools;
      maintaining the IP address leases;
      receiving, from a packet data unit (PDU) session network function (NF) service instance of an SMF that handles PDU sessions requested by user equipment (UEs) and includes a plurality of PDU session NF service instances, a request for allocation of an IP address;
      allocating one of the IP addresses from one of the pools to the PDU session NF service instance of the SMF; and
      communicating the IP address to the PDU session NF service instance of the SMF.

2. The method of claim 1 wherein obtaining the IP addresses and corresponding IP address leases from the DHCP servers includes requesting allocation of IP addresses from the DHCP servers until an initial number of IP addresses is present in each of the IP address pools.

3. The method of claim 2 wherein the initial number is a static number set by a network operator.

4. The method of claim 2 wherein the initial number is a dynamic number that is set dynamically based on a volume of IP address allocation requests from SMFs.

5. The method of claim 1 wherein maintaining the IP address leases includes, for each IP address lease:
   maintaining a lease renewal timer that is configured to expire prior to a lease expiration time for the IP address lease;
   detecting expiration of the lease renewal timer; and
   in response to expiration of the renewal timer, transmitting, to the DHCP servers, a renewal request for requesting renewal of the IP address lease.

6. The method of claim 5 comprising maintaining a timer queue with entries for each IP address lease, wherein detecting expiration of the renewal timer includes detecting when a current time is equal to a timer value for an entry at the head of the timer queue and, removing the entry from the head of the timer queue.

7. The method of claim 6 comprising receiving, from the DHCP servers, a response to the renewal request containing a renewed lease expiration time and creating a new entry in the timer queue at a location corresponding to the renewed lease expiration time.

8. The method of claim 1 wherein maintaining the IP address leases includes maintaining the IP address leases transparently from the SMF.

9. The method of claim 8 wherein maintaining IP addresses leases transparently from the SMF includes automatically renewing the IP address leases in response to expiration of lease renewal timers at the IP address provider microservice.

10. The method of claim 1 comprising providing an application programming interface (API) for the PDU session NF service instances of the SMF to request, from the IP address provider microservice, allocation of IP addresses, and wherein receiving the request for allocation of an IP address includes receiving the request via the API.

11. A system for obtaining and maintaining Internet protocol (IP) address pools and using the IP address pools to respond to IP address allocation requests from service management functions (SMFs), the system comprising:
   at least one processor and a memory; and
   an IP address provider microservice including a plurality of IP address microservice instances implemented using the at least one processor for obtaining, from a plurality of dynamic host configuration protocol (DHCP) servers, a plurality of IP addresses and corresponding IP address leases and storing, in the memory, which is accessible by the IP address provider microservices and separate from the DHCP servers, the IP addresses as IP address pools, maintaining the IP address leases, receiving, from a packet data unit (PDU) session network function (NF) service instance of an SMF that handles PDU sessions requested by user equipment (UEs) and includes a plurality of PDU session NF service instances, a request for allocation of an IP address, allocating one of the IP addresses from one of the pools to the PDU session NF service instance of the SMF, and communicating the IP address to the PDU session NF service instance of the SMF.

12. The system of claim 11 wherein the IP address provider microservice is configured to obtain the IP addresses and corresponding IP address leases from the DHCP servers by requesting allocation of IP addresses from the DHCP servers until an initial number of IP addresses is present in each of the IP address pools.

13. The system of claim 12 wherein the initial number is a static number set by a network operator.

14. The system of claim 12 wherein the initial number is a dynamic number that is set dynamically based on a volume of IP address allocation requests from SMFs received within a time period.

15. The system of claim 11 wherein the IP address provider microservice is configured to maintain the IP address leases by, for each IP address lease:
   maintaining a lease renewal timer that is configured to expire prior to a lease expiration time for the IP address lease;
   detecting expiration of the lease renewal timer; and
   in response to expiration of the lease renewal timer, transmitting, from the IP address provider microservice to the DHCP servers, a renewal request requesting renewal of the IP address lease.

16. The system of claim 15 wherein the IP address provider microservice is configured to maintain a timer queue with entries for each IP address lease, to detect the expiration of the renewal timer for a lease by determining when a current time is equal to a lease renewal timer value for an entry at the head of the timer queue and to remove the entry from the head of the timer queue.

17. The system of claim 16 wherein the IP address provider microservice is configured to receive, from the DHCP servers, a response to the lease renewal request containing a renewed lease expiration time and to create a new entry in the timer queue at a location corresponding to the renewed lease expiration time.

18. The system of claim 16 wherein the IP address provider microservice is configured to maintain the IP address leases transparently from the SMF by automatically renewing the IP address leases in response to expiration of lease renewal timers at the IP address provider microservice.

19. The system of claim 11 wherein the IP address provider microservice is configured to provide an application programming interface (API) for the PDU session NF service instances of the SMF to request, from the IP address provider microservice, allocation of IP addresses, and wherein receiving the request for allocation of an IP address includes receiving the request via the API.

20. A non-transitory computer readable medium having stored thereon executable instructions that when executed by at least one processor of a computer controls the computer to perform steps comprising:
    at an Internet protocol (IP) address provider microservice including a plurality of IP address microservice instances implemented using the at least one processor:
        obtaining, from a plurality of dynamic host configuration protocol (DHCP) servers, a plurality of IP addresses and corresponding IP address leases and storing, in memory of the IP address provider microservice, which is separate from the DHCP servers, the IP addresses in IP address pools;
        maintaining the IP address leases;
        receiving, from a packet data unit (PDU) session network function (NF) service instance of a service management function (SMF) that handles PDU sessions requested by user equipment (UEs) and includes a plurality of PDU session NF service instances, a request for allocation of an IP address;
        allocating one of the IP addresses from one of the pools to the PDU session NF service instance of the SMF; and
        communicating the IP address to the PDU session NF service instance of the SMF.

* * * * *

UNITED STATES PATENT AND TRADEMARK OFFICE
CERTIFICATE OF CORRECTION

PATENT NO. : 11,418,479 B2
APPLICATION NO. : 17/125925
DATED : August 16, 2022
INVENTOR(S) : Yesh Goel It is certified that error appears in the above-identified patent and that said Letters Patent is hereby corrected as shown below:

In the Drawings

On sheet 2 of 8, in FIG. 3, Line 6, delete "TMIE" and insert -- TIME --, therefor.

On sheet 7 of 8, in FIG. 9, Line 1, delete "ADDDRESS" and insert -- ADDRESS --, therefor.

In the Specification

In Column 1, Line 42, delete "network function" and insert -- network --, therefor.

In Column 4, Line 24, delete "m icroservice." and insert -- microservice. --, therefor.

In Column 6, Line 27, delete "(loT)" and insert -- (IoT) --, therefor.

In Column 7, Line 52, delete "SMF[H]." and insert -- SMF. --, therefor.

In Column 7, Line 58, delete "hi" and insert -- In --, therefor.

In Column 8, Line 58, delete "IPv8" and insert -- IPv6 --, therefor.

In Column 12, Line 20, delete "922" and insert -- 922. --, therefor.

Signed and Sealed this
Twenty-ninth Day of August, 2023

*Katherine Kelly Vidal*

Katherine Kelly Vidal
*Director of the United States Patent and Trademark Office*